US009532552B2

(12) United States Patent
Van De Zande (10) Patent No.: US 9,532,552 B2
(45) Date of Patent: Jan. 3, 2017

(54) DEVICE AND SYSTEM FOR PROCESSING OF EGGS, SUCH AS VACCINATION OR A VACUUM SUCTION OR GRABBER BASED PICK UP

(71) Applicant: VISCON B.V., 's-Gravendeel (NL)

(72) Inventor: Nicolaas Karel Van De Zande, Nieuw-Beijerland (NL)

(73) Assignee: VISCON B.V. (NL)

( * ) Notice: Subject to any disclaimer, the term of this patent is extended or adjusted under 35 U.S.C. 154(b) by 0 days.

(21) Appl. No.: 14/394,003

(22) PCT Filed: Apr. 2, 2013

(86) PCT No.: PCT/EP2013/056914
§ 371 (c)(1),
(2) Date: Oct. 10, 2014

(87) PCT Pub. No.: WO2013/152970
PCT Pub. Date: Oct. 17, 2013

(65) Prior Publication Data
US 2015/0327520 A1    Nov. 19, 2015

(30) Foreign Application Priority Data
Apr. 13, 2012    (EP) .................................... 12164167

(51) Int. Cl.
*A01K 45/00*    (2006.01)
*A61D 1/02*    (2006.01)

(52) U.S. Cl.
CPC .............. *A01K 45/007* (2013.01); *A61D 1/025* (2013.01)

(58) Field of Classification Search
CPC ...... A01K 45/007; A01K 43/00; A61D 1/025; B65B 23/08
(Continued)

(56) References Cited

U.S. PATENT DOCUMENTS 505,429 A * 9/1893 Alderson ................ B65B 23/08
209/510
851,631 A * 4/1907 Swanson ................ B65B 23/08
294/87.12
(Continued)

FOREIGN PATENT DOCUMENTS

FR    2914143 A1    10/2008
JP    S58129617 A    8/1983
(Continued)

OTHER PUBLICATIONS

International Search Report and Written Opinion mailed Jul. 17, 2014 (PCT/EP2013/056914); ISA/EP.

*Primary Examiner* — Yvonne Abbott-Lewis
(74) *Attorney, Agent, or Firm* — Banner & Witcoff, Ltd.

(57) ABSTRACT

A device, assembled to subject at least one egg that normally has a longitudinal direction between a blunt end and a pointed end to a processing in a predetermined orientation of the longitudinal direction of the egg, such as injection or vaccination, candling or vacuum or grabber based pick-up. The device includes a processing station arranged to subject the egg to the processing; a holder arranged to hold the egg in said predetermined orientation for the processing station to subject the egg to the processing. The holder includes a support, arranged to engage one of said two ends of the egg; and a cylindrical accommodation comprising at least two arms extending from the support in use in the longitudinal direction of the egg to engage the egg at a distance from the support, wherein the arms are flexible and the cylindrical accommodation is curved in correspondence with the circumferential shape of the egg. The arms are arranged to yield and align the egg when the arms move over the egg.

14 Claims, 5 Drawing Sheets

(58) Field of Classification Search
USPC ................ 119/6.8, 322, 338, 348; 294/87.12
See application file for complete search history.

(56) References Cited

U.S. PATENT DOCUMENTS

| | | | | |
|---|---|---|---|---|
| 879,801 | A * | 2/1908 | Swanson | B65B 23/08 294/87.12 |
| 1,184,372 | A * | 5/1916 | Nalley | B65B 23/08 294/100 |
| 1,220,439 | A * | 3/1917 | Danner | G01N 33/085 294/87.12 |
| 1,500,939 | A * | 7/1924 | Howell | B65B 23/08 294/87.12 |
| 2,177,595 | A * | 10/1939 | Freed | B65B 23/08 294/100 |
| 2,666,665 | A * | 1/1954 | Whitcher | A23B 5/065 294/87.12 |
| 2,714,523 | A * | 8/1955 | Bliss | B65B 23/08 119/329 |
| 2,792,253 | A | 5/1957 | Bliss | |
| 2,948,564 | A * | 8/1960 | Carkhuff | B65B 23/08 294/87.12 |
| 3,061,352 | A * | 10/1962 | Hirt | A01K 43/00 294/65 |
| 4,469,047 | A * | 9/1984 | Miller | A01K 45/007 119/6.8 |
| 8,292,340 | B2 * | 10/2012 | Hebrank | A01K 43/00 294/87.12 |
| 2003/0056729 | A1 | 3/2003 | Correa et al. | |
| 2004/0040511 | A1 * | 3/2004 | Williams | A01K 45/007 119/6.8 |
| 2004/0144324 | A1 | 7/2004 | Gross et al. | |
| 2009/0078205 | A1 * | 3/2009 | Hebrank | A01K 45/007 119/6.8 |
| 2009/0183685 | A1 | 7/2009 | Correa et al. | |
| 2010/0180821 | A1 | 7/2010 | Poulard et al. | |
| 2013/0239895 | A1 * | 9/2013 | Federowicz | A01K 45/007 119/6.8 |
| 2015/0272085 | A1 * | 10/2015 | Suh | A01K 45/00 119/6.8 |

FOREIGN PATENT DOCUMENTS

| | | |
|---|---|---|
| JP | 2004520068 A | 7/2004 |
| JP | 2012228217 A | 11/2012 |

* cited by examiner

DEVICE AND SYSTEM FOR PROCESSING OF EGGS, SUCH AS VACCINATION OR A VACUUM SUCTION OR GRABBER BASED PICK UP

The present application is a U.S. National Phase filing of International Application No. PCT/EP2013/056914, filed on Apr. 2, 2013, designating the United States of America and claiming priority to EP Patent Application No. 12164167.4, filed Apr. 13, 2012. The present application claims priority to and the benefit of all the above-identified applications, and all the above-identified applications are incorporated by reference herein in their entireties.

The present invention relates to a device and a system for processing of eggs, such as vaccination or injection of the eggs. Further the invention may be applicable for candling or the like, and more in particular any application where a predetermined orientation or alignment of eggs is needed or necessary. In addition, alignment of eggs can also play an important role for presenting eggs to be picked up using— for example—suction cups or a grabber.

For instance, when vaccinating eggs, a needle is normally injected through the egg shell. Eggs normally have a pointed end and a blunt end. An air pocket is normally situated inside the egg at one of these ends, normally the blunt end of the egg. When injecting or vaccinating eggs care should be taken not to harm the embryo inside the egg. When the needle is not inserted at precisely an extreme end of the egg, i.e. one of the blunt or pointed end, a higher risk exists that the shell may be cracked, than when the egg is injected at precisely one of the blunt and pointed ends. When candling an egg, the egg should preferably be oriented with a longitudinal axis thereof (running between the blunt and pointed ends) at an orientation that is perpendicular relative a line of sight to review and candle the egg.

When picking up eggs using vacuum suction cups or a grabber, cups or grabbers should normally be shaped and dimensioned in relation to specific portion of the eggs to allow the best result in terms of numbers of eggs actually picked up using the suctions cups or grabbers. In order to achieve a high success rate picking up the eggs, these should be presented to the suction cups or grabbers in a predetermined orientation as much as possible, to enable the suction cups or grabbers to engage precisely onto the eggs at the portion thereof, in relation to which the suctions cups or grabbers are shaped and formed.

To the best knowledge of the inventors of the present invention, no device or system is in existence that would allow automatic vaccination or injection or candling or presenting for pick up of eggs (or any other purpose) with precisely the right orientation or alignment of the eggs relative to a line of sight (as in the case of candling) and/or a direction of processing (as in the cases of for instance injection and/or vaccination and/or vacuum or grabber based pick-up). Especially in view of the above requirements corresponding with different types of processing (vaccination/injection and candling and vacuum or grabber based pick-up) and in relation with the required positioning or orientation of eggs during such processing, the known prior art only relates to manually executed aligning and processing, where through human error and tedious and repetitive actions damage to embryo's or egg shells will inevitably continue to occur. Thus there is a desire for an automated solution, where no such solution is known to the inventors.

The present invention is directed at alleviating if not obviating the drawbacks of the prior art, for which a device and a system are provided in correspondence with the appended independent device and system claims.

According to a first aspect of the invention, a device is provided, assembled to subject at least one egg, said egg normally having a longitudinal direction between a blunt end and a pointed end, to a processing in a predetermined orientation of the longitudinal direction of the egg, such as injection or vaccination, candling or vacuum or grabber based pick-up, wherein the device comprises: a processing station arranged to subject the egg to the processing; a holder arranged to hold the egg in said predetermined orientation for the processing station to subject the egg to the processing, wherein the holder comprises: a support, arranged to engage one of said two ends of the egg; and a cylindrical accommodation defined by least two arms, which are connected to and extend from the support in use in the longitudinal direction of the egg to engage the egg at a distance from the support, wherein the arms are flexible and curved in correspondence with the circumferential shape of the egg and in use yield to align the egg when the arms move over the egg to be engaged by the support.

Further according to a second aspect of the present invention, a system is provided, comprising aforementioned device and at least a supply for egg crates, each crate comprising at least one row of compartments each for accommodating one egg to be processed, wherein the device comprises at least one pair of a holder and a processing station arranged opposite one another relative to a throughput direction defined by at least the supply.

With the device and system according to the present invention, automated processing and aligning of the eggs prior to the processing is made possible, since a positive alignment or arranging eggs in the predetermined orientation may be achieved prior to actual processing. The predetermined alignment of the egg is preferably in the direction between the blunt end and the pointed end of the egg, or the longitudinal axis thereof, oriented very precisely in line with the direction defined by the cylindrical accommodation.

It is noted that with an egg placed in the holder, a gentle enclosing or resilient clamping force by the resilient arms in or of the holder may suffice to align the egg, in particular already when the arms move over the egg, i.e. when the egg is moved into the holder to be engaged by the support. Since the arms are flexible and curved in correspondence with the circumferential shape of the egg seen from the relevant one of said two ends of the egg, the egg may be stably supported and aligned in, by or at the holder.

The egg may be processed at one of the ends thereof or an intermediate location, as long as the positioning of the processing station relative to the egg is reliably predictable, which is preferably but not exclusively at one of the egg's blunt or pointed ends. Processing of the egg there may minimize the risk of fracture of the egg's shell. To allow the processing to take place, either of the holder and the abutment may comprise a passage to enable insertion or injection, for instance, of a needle, thus providing an access to the blunt end or pointed end of the egg, which suffices to provide an elegant and simple configuration. Thereby the egg at the location of processing may further also be bolstered by the presence of the holder and/or the abutment. Some vibrations may be used to align the egg in the holder and against or in the abutment. The abutment may accommodate—in use—the blunt or the pointed end of the egg, and the same is true for the holder.

The system enables separate or simultaneous processing of a plurality of eggs in a row or a plurality of rows. With multiple pairs of holders and abutments the processing times may increase relative to processing of one egg at a time. There is a balance between costs for providing large numbers of pairs of holders and abutments for the eggs and the throughput efficiency afforded thereby.

The present invention has many preferred embodiments, for example those defined in the appended dependent claims, to which the invention is, however, not limited. Some of these embodiments are as set out in the dependent claims, and other or additional embodiments may be indicated in the below description of preferred embodiments referring to the appended drawing, whilst the scope of protection is exclusively defined in the appended independent claims.

For instance in an embodiment the device is such that an abutment is provided to align the egg against or there in, which abutment is at least generally shaped in correspondence with another of said two ends of the egg, against or into which the egg abuts, aligned in the predetermined orientation.

For instance in an additional or alternative embodiment, at least one of the holder and the abutment comprises a press arranged to clamp the egg between the holder and the abutment in the predetermined orientation of the egg. Forces exerted by the press should preferably be restricted, to prevent damage to the egg. The exerted force may include a vibration to improve alignment of the egg when arranged between the holder and against or in the abutment.

For instance in an additional or alternative embodiment, the device is such that at least one of the holder and the abutment is resilient. This will contribute to and improve the alignment of the egg in the predetermined orientation.

For instance in an additional or alternative embodiment having a press and a resilient holder or abutment, the device is such that the press is resilient. This will contribute to and improve the alignment of the egg in the predetermined orientation.

For instance in an additional or alternative embodiment, the device is such that the abutment comprises at least one recess for accommodating the egg. This may cup the relevant end of the egg, for instance to bolster the egg, but moreover also to allow the egg to set in the recess in order to achieve the desired predetermined orientation of the egg. In such an embodiment a device according to the invention may further have the feature that the recess is concave. Preferably the shape of the recess at least partially approximates the shape of the relevant end of the egg in the desired predetermined position, so that an egg arranged in or against the recess but in another than the desired predetermined orientation will tend even more to align in the predetermined orientation.

For instance in an additional or alternative embodiment, the device is such that the abutment is smooth, such that a shell of the egg can shift or slide there over to attain the predetermined orientation of the egg. With or without a clamping force and optionally vibrations therein, and/or a cup shaped or concave recess, promoting the possibility of shifting and/or sliding of the egg in or against the abutment will improve the tendency of the egg to align in the desired predetermined orientation.

For instance in an additional or alternative embodiment, the device is such that the holder and the abutment cooperate to align the egg in the predetermined orientation. The egg will align better as a consequence of the cooperation.

For instance in an additional or alternative embodiment, the device is such that the support defines a cup shape, preferably concave, arranged to—in use—engage the relevant end of the egg. Thereby the egg may be stably supported in, by or at the holder.

For instance in an additional or alternative embodiment, the device is such the holder comprises at least three arms, each of which is connected to the support and having a free end to—in use—engage the egg at a distance from the support. Thereby the egg may be stably supported in, by or at the holder. Also, in such an embodiment the device according to the present invention may comprise flexible extensions at the free ends of the arms to—in use —yield to engage the egg at a distance from the relevant end of the egg. Thereby the egg may be stably supported in, by or at the holder.

For instance in an additional or alternative embodiment, the device is such that the processing station comprises at least one of an injection device, a vaccination device, and a vacuum or grabber based pick-up system. Especially in such an embodiment, providing a passage through either one or both of the holder and the abutment is of importance, to allow a needle to reach and penetrate the egg shell at the location of the holder and/or the abutment.

After the above general indication of features of the present invention, below a specific embodiment will be described, referring to the appended drawing of a preferred embodiment, to which the present invention is by no means limited, since restriction of the scope of protection for the present invention is only as defined in the appended claims, in particular the independent claims relating to the device and the system. Moreover, in different views of the drawing, the same or similar aspects, features and components/elements may be designated using the same reference numbers. In the drawing:

Figure 1:
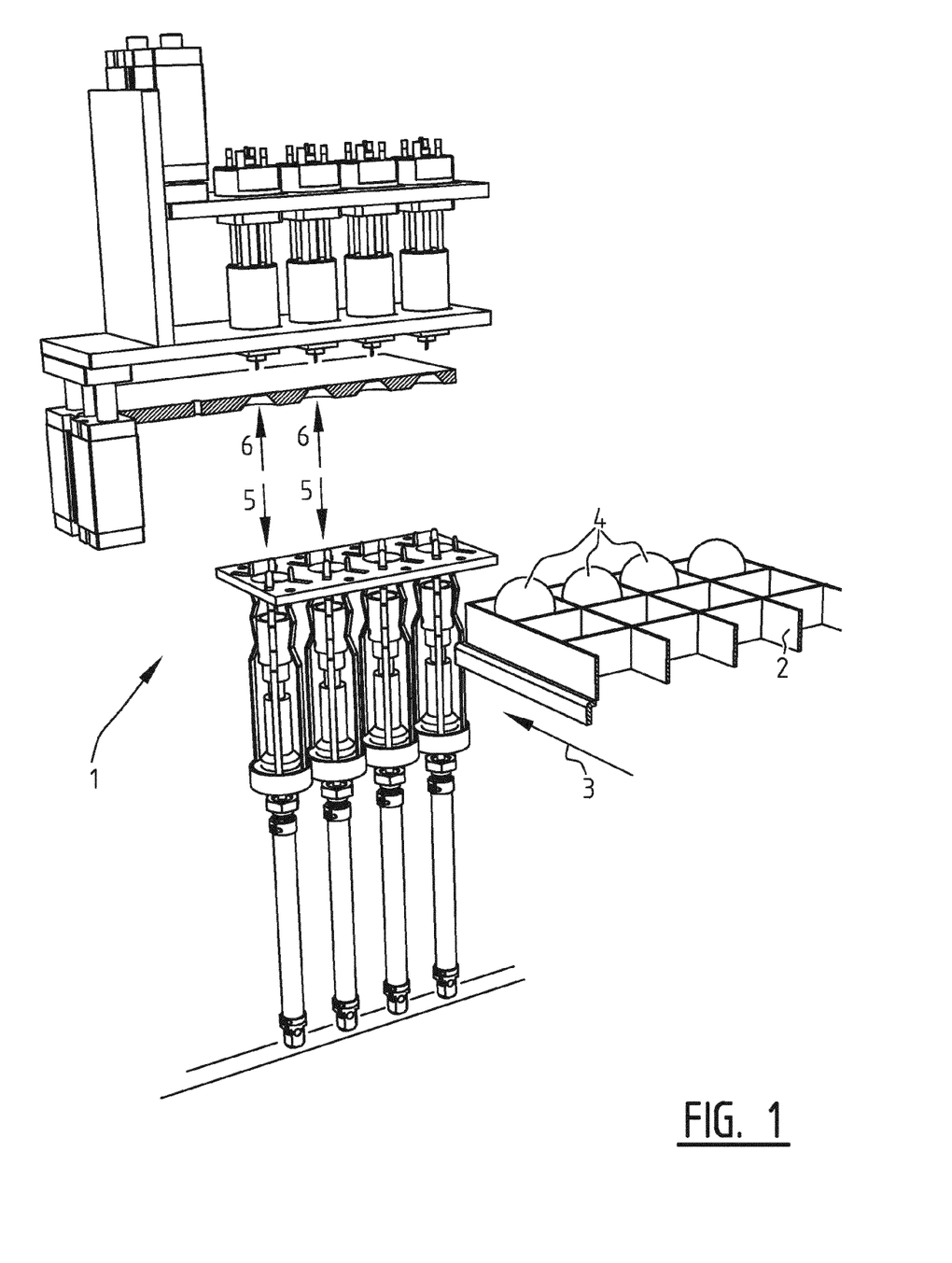
FIG. 1 shows a schematic perspective view of a device and a system according to the present invention.

In FIG. 1 a device 1 in conjunction with an egg crate 2 is shown. The egg crate 2 holds eggs 4, and is supplied by a supply which is schematically represented by arrow 3.

Figure 2:
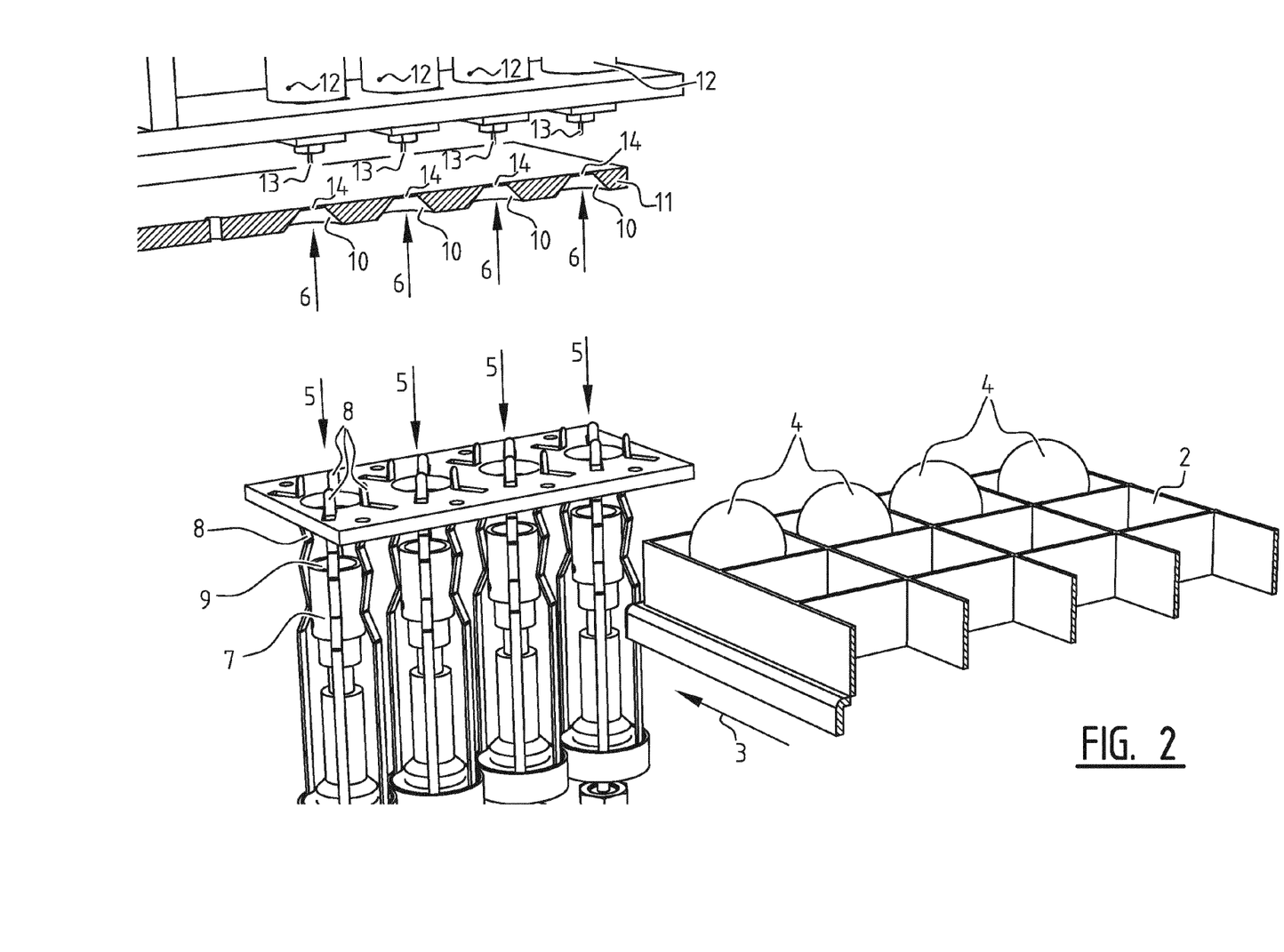
FIG. 2 shows in more detail a portion of the device and system of FIG. 1.

The device 1 comprises a row of pairs of holders 5 and abutments 6. The number of pairs of holders 5 and abutments 6 may be equal to the number of eggs 4 in a row of the egg crate 2. In FIGS. 1 and 2, four pairs of holders 5 and abutments 6 are shown, but therefore this number of pairs may be larger or smaller, depending on a balance between costs for providing more of such pairs and an attained through put efficiency. The device may even contain more rows of pairs for simultaneous processing of all eggs 4 in a crate 2. In contrast, the device 1 may contain just a single pair of a holder 5 and an abutment 6, to process one egg in the crate 2 at a time.

Each holder 5 comprises a support 7 and four arms 8, defining a cylindrical accommodation, which arms are unevenly distributed around the support 7. The four arms 8 may alternatively be arranged at the support 7 in a uniformly distributed manner around the support 7. The arms 8 in an extended position (see below) define a cup shape for accommodating an egg 4, to extend around a circumference of the egg 4, and the support 7 also has a bowl shaped top 9.

Opposite the holders 5 in the pairs, the abutments 6 comprise a concave recess 10 in a plate 11. Above the plate 11, injection devices 12 are arranged, each having a needle 13, where the needles 13 of the injection devices 12 are arranged to be inserted into and through passages 14 at the top of the concave recesses 10 forming the abutments 6.

It is noted here that the plate 11 defines a shield to protect the needles 13 of the injection devices 12 and the injection devices themselves against dirt and filth that may be clinging to the eggs, when supplied in the crates 2 to the device 1.

In use, an egg crate 2 is supplied in the direction of arrow 3, as indicated above. When a row of eggs 4 is situated between holders 5 and abutments 6, a selection of cylinders 15 is driven to lift the eggs 4 out of the compartments 16 in the crate 2. Unfertilized eggs or those without an embryo can be, after detection thereof, omitted from injection/vaccination using the injection devices 12. In the example, shown in FIG. 3, one of the eggs 4 is not lifted up out of the crate 2. This is an egg with a dead embryo or an unfertilized egg. Later on, the relevant egg may be removed from the crate 2. If selection is performed beforehand, the cylinders corresponding with empty egg positions in the crate may also remain motionless. The selection of cylinders 15 is extended in the direction of arrow 17, raising the supports 7 with the bowl shaped top 9 underneath the eggs 4 and continuing on through the crate 2.

Before pushing an egg 4 up out of the crate 2, the arms 8, defining the cylindrical accommodation of each holder 5, are made to slide over the circumferential surface of the egg 4 to align the egg. Each of the arms 8 comprises a number of extensions 18, which are hingedly or flexibly interconnected to closely follow the circumferential surface of the eggs 4, as indicated clearly at 19 in FIG. 3. The arms 8 have a shape or curvature, corresponding with at least a bottom half of the egg 4.

Figure 3:
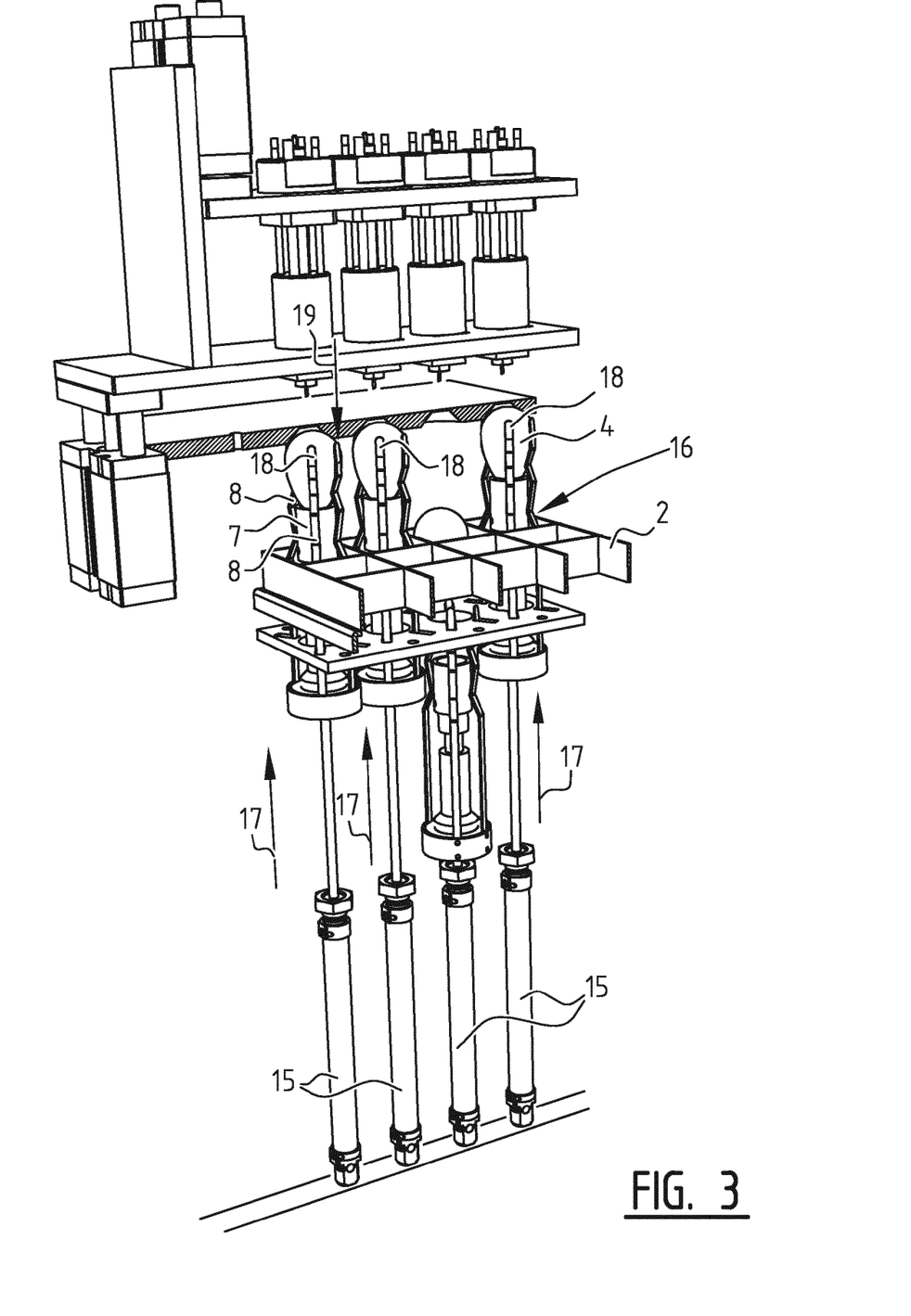
FIG. 3 shows a first step in operation of the device according to the present invention.
Figure 4:
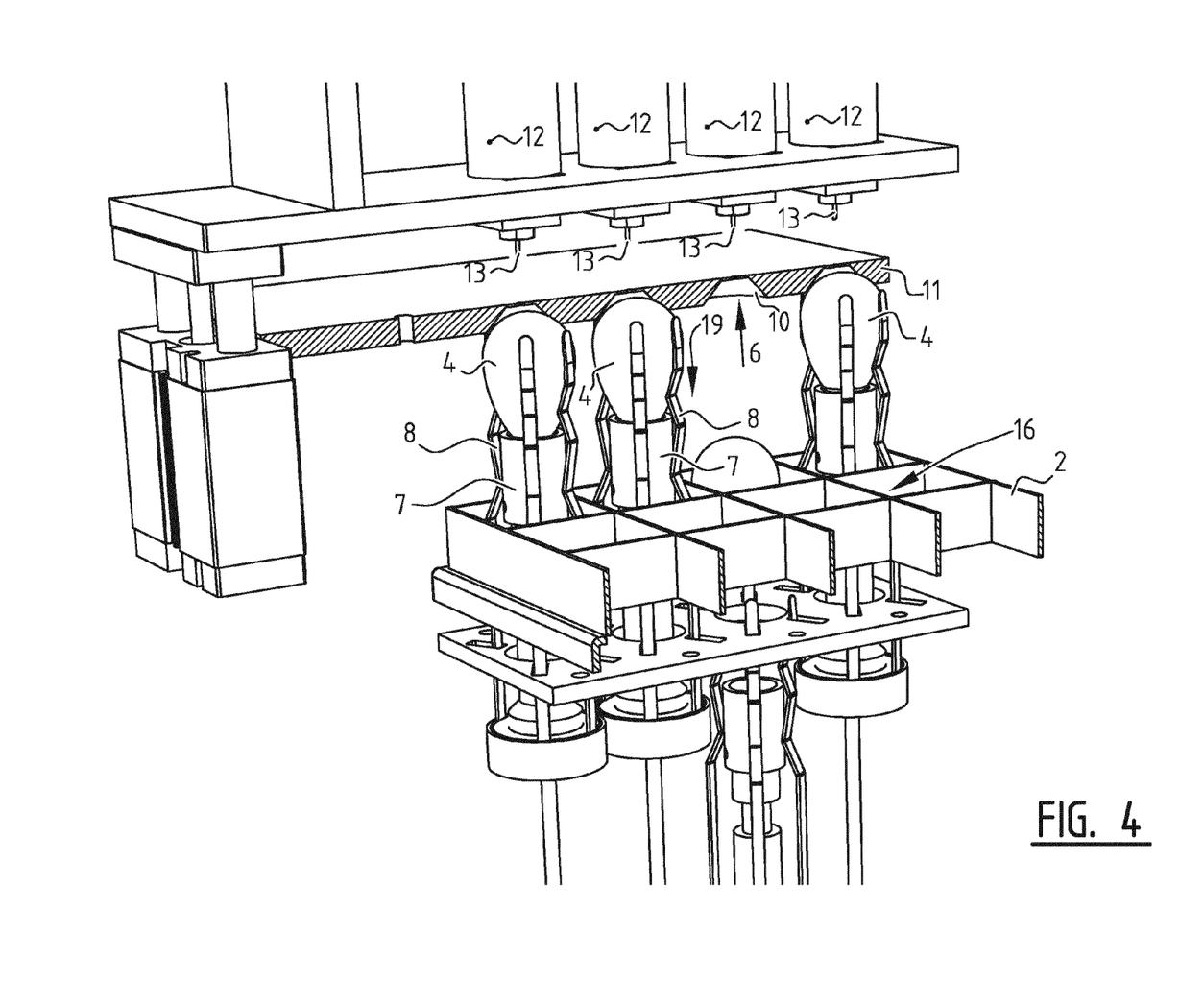
FIG. 4 shows in more detail a perspective view corresponding with the representation of FIG. 3.

When the extensions 18 enclose over the circumferential surface of the eggs 4 and the eggs 4 are supported in the bowl shaped top 9 of the support 7, a proper alignment of the eggs 4 is achieved.

Figure 5:
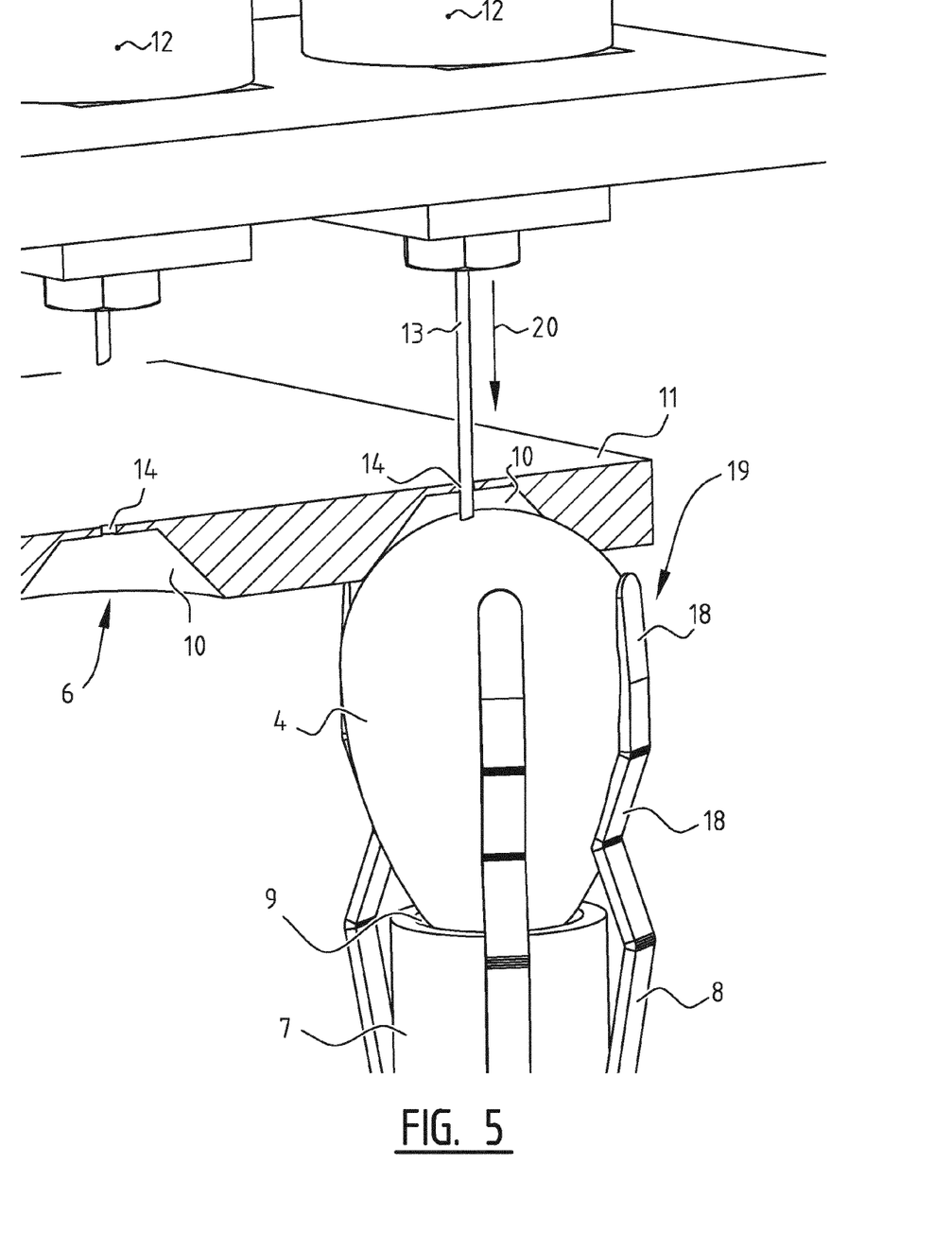
FIG. 5 shows an example of processing of the egg, for instance by injecting a needle into the blunt end of the egg.

As a consequence of a further upward drive using cylinders 15, eggs 4 are made to be accommodated in the concave recesses 10 forming the abutments 6 in the plate 11. As described above, the abutments 6 are formed by concave recesses 10, into which the eggs 4 are pressed, with a restricted or limited force. As a consequence of the pressing force in combination with the concave and preferably smooth surface of the recesses 10, a further improvement in the predetermined and desired alignment of the eggs 4 may be achieved. As a result, with certainty a desired predetermined alignment is achieved prior to injecting the egg using a needle 13 in the direction of arrow 19, as shown in FIG. 5, through the passages 14 at the top of the concave recesses 10 in the plate 11.

It is noted that as a consequence of the construction of configuration of the arms 8 extending over the circumferential surface of the eggs 4 in combination with the bowl shaped top of the support 7, alignment of eggs is practically already achieved, when an egg 4 is lifted out of the crate 2. Pressing the egg with the blunt end thereof into the concave recess 10 may further improve the desired and predetermined alignment of the egg 4 in the recess 10. Consequently, a desired predetermined orientation of eggs 4 may already be achieved without the use of the abutments 6 formed by recesses 10 in plate 11, merely using the support 7 and the corresponding arms 8, of which four are provided per support 8.

It is to be noted, that the present invention is by no means, with respect to the scope of protection thereof, restricted to the specific embodiments described above, referring to the appended drawing. For instance, as few as two arms 8 per support 7 may be arranged, provided that these extend in FIG. 5 horizontally over a larger surface of the eggshell of the egg 4. The movement of the arms 8 over the eggshell of the egg 4 already achieves alignment of the egg in a desired predetermined orientation to a high extend. Three arms 8 like the ones in FIG. 5 could also be arranged. The holders 5 may comprise the injection devices, rather than the injection devices being arranged at or above the abutments 6. More and other additional and alternative embodiments are possible within the scope of protection as defined by and in the appended claims, and only if future embodiments do not comply in spirit or by definition with the appended claims, such future embodiments are not to be in considered as included in the scope of protection for the present invention.

The invention claimed is:

1. A device, assembled to subject at least one egg, said egg normally having a longitudinal direction between a blunt end and a pointed end, to a processing in a predetermined orientation of the longitudinal direction of the egg, wherein the device comprises:
   a processing station arranged to subject the egg to the processing;
   a holder arranged to hold the egg in said predetermined orientation for the processing station to subject the egg to the processing, wherein the holder comprises:
      a support, arranged to engage one of said two ends of the egg; and
      a cylindrical accommodation, defined by at least two arms, which are connected to and extend from the support in use in the longitudinal direction of the egg to engage the egg at a distance from the support, wherein the arms are flexible and the cylindrical accommodation is curved in correspondence with the circumferential shape of the egg and the arms are arranged to yield and align the egg when the arms move over the egg when the egg is to be engaged by the support.

2. The device as claimed in claim 1, further comprising an abutment, which is at least generally shaped in correspondence with another of said two ends of the egg, against or into which the egg abuts, aligned in the predetermined orientation.

3. The device as claimed in claim 2, wherein the abutment comprises at least one recess for accommodating the egg.

4. The device as claimed in claim 2, wherein at least one of the holder and the abutment comprises a press arranged to clamp the egg between the holder and the abutment in the predetermined orientation of the egg.

5. The device as claimed in claim 2, wherein the abutment is smooth, such that a shell of the egg can shift or slide there over to attain the predetermined orientation of the egg.

6. The device as claimed in claim 2, wherein the holder and the abutment cooperate to align the egg in the predetermined orientation.

7. The device as claimed in claim 3, wherein the recess is concave.

8. The device as claimed in claim 4, wherein the press is resilient.

9. The device according to claim 2, wherein at least one of the holder and the abutment is resilient.

10. The device as claimed in claim 1, wherein the support defines a cup shape arranged to engage the relevant end of the egg.

11. The device as claimed in claim 1, wherein the holder comprises at least three arms, each of which is connected to the support and has a free end to engage the egg at a distance from the support.

12. The device as claimed in claim 1, wherein the arms comprise flexible extensions at free ends of the arms opposite the support.

13. The device as claimed in claim 1, wherein the processing station comprises at least one of an injection device, a vaccination device, and a vacuum or grabber based pick-up system.

14. A system, comprising:
  a device assembled to subject at least one egg, said egg normally having a longitudinal direction between a blunt end and a pointed end, to a processing in a predetermined orientation of the longitudinal direction of the egg, wherein the device comprises:
    a processing station arranged to subject the egg to the processing;
    a holder arranged to hold the egg in said predetermined orientation for the processing station to subject the egg to the processing, wherein the holder comprises:
      a support, arranged to engage one of said two ends of the egg; and
      a cylindrical accommodation, defined by at least two arms, which are connected to and extend from the support in use in the longitudinal direction of the egg to engage the egg at a distance from the support, wherein the arms are flexible and the cylindrical accommodation is curved in correspondence with the circumferential shape of the egg and the arms are arranged to yield and align the egg when the arms move over the egg when the egg is to be engaged by the support, and
  a supply for egg crates, each crate comprising at least one row of compartments each compartment accommodating one egg to be processed,
  wherein the device comprises a holder and a processing station arranged opposite one another relative to a throughput direction defined by the supply.

* * * * *